(12) United States Patent
Hur et al.

(10) Patent No.: US 9,847,577 B2
(45) Date of Patent: Dec. 19, 2017

(54) FERRITE GREEN SHEET, SINTERED FERRITE SHEET, FERRITE COMPOSITE SHEET COMPRISING THE SAME, AND CONDUCTIVE LOOP ANTENNA MODULE

(71) Applicant: 3M INNOVATIVE PROPERTIES COMPANY, St. Paul, MN (US)

(72) Inventors: Eun-Kwang Hur, Seoul (KR); Jung-Ju Suh, Kueonggi-Do (KR); Seungah Cho, Seoul (KR); Suk-Won Choi, Seoul (KR)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/649,568

(22) PCT Filed: Dec. 2, 2013

(86) PCT No.: PCT/US2013/072634
§ 371 (c)(1),
(2) Date: Jun. 4, 2015

(87) PCT Pub. No.: WO2014/088954
PCT Pub. Date: Jun. 12, 2014

(65) Prior Publication Data
US 2015/0349424 A1    Dec. 3, 2015

(30) Foreign Application Priority Data

Dec. 6, 2012 (KR) .................. 10-2012-0141485
Jul. 16, 2013 (KR) .................. 10-2013-0083828

(51) Int. Cl.
*H01Q 7/06*    (2006.01)
*H04B 5/00*    (2006.01)
(Continued)

(52) U.S. Cl.
CPC .............. *H01Q 7/06* (2013.01); *C04B 35/26* (2013.01); *H01F 1/344* (2013.01); *H01F 7/0273* (2013.01);
(Continued)

(58) Field of Classification Search
CPC .................................. H01Q 7/06; H01Q 1/22
(Continued)

(56) References Cited

U.S. PATENT DOCUMENTS

| | | | | |
|---|---|---|---|---|
| 4,034,377 A | * | 7/1977 | Knox | ........................ H01P 1/11 333/1.1 |
| 6,362,716 B1 | * | 3/2002 | Anbo | .................... H01F 41/043 336/200 |

(Continued)

FOREIGN PATENT DOCUMENTS

| | | |
|---|---|---|
| JP | 2005-015293 | 1/2005 |
| JP | 2007-184492 | 7/2007 |

(Continued)

OTHER PUBLICATIONS

International Search Report for PCT International application No. PCT/US2013/072634, dated Mar. 7, 2014, 3pgs.

*Primary Examiner* — Peguy Jean Pierre
(74) *Attorney, Agent, or Firm* — Robert S. Moshrefzadeh

(57) ABSTRACT

Disclosed are a ferrite green sheet comprising a pattern formed in a top surface of the ferrite green sheet, a sintered ferrite sheet, a ferrite composite sheet comprising the same, and a conductive loop antenna module. The pattern comprises a plurality of grooves, each groove has a width W and a rounded shape bottom having a radius of curvature of R, wherein a ratio of W to R (W:R) is in the range of 1:0.1 to 1:0.5.

16 Claims, 11 Drawing Sheets

(51) Int. Cl.
*H01F 7/02* (2006.01)
*H01Q 1/22* (2006.01)
*C04B 35/26* (2006.01)
*H01F 1/34* (2006.01)

(52) U.S. Cl.
CPC ......... *H01Q 1/2225* (2013.01); *H04B 5/0031* (2013.01); *C04B 2235/3241* (2013.01); *C04B 2235/3277* (2013.01); *C04B 2235/3279* (2013.01); *C04B 2235/3281* (2013.01); *C04B 2235/3284* (2013.01); *C04B 2235/3298* (2013.01); *C04B 2235/5436* (2013.01); *C04B 2235/5445* (2013.01); *C04B 2235/608* (2013.01); *C04B 2235/6025* (2013.01); *C04B 2235/945* (2013.01); *H04B 5/0081* (2013.01)

(58) Field of Classification Search
USPC ........................................................ 343/788
See application file for complete search history.

(56) References Cited

U.S. PATENT DOCUMENTS

| 7,910,214 | B2 | 3/2011 | Kimura | |
|---|---|---|---|---|
| 8,323,776 | B2* | 12/2012 | Nishi | C04B 35/26 428/167 |
| 2008/0224937 | A1* | 9/2008 | Kimura | C04B 35/265 343/787 |
| 2009/0322461 | A1* | 12/2009 | Hebert | H01F 17/0033 7/33 |
| 2012/0088070 | A1 | 4/2012 | Nishi | |
| 2014/0374137 | A1* | 12/2014 | Kwon | C21D 8/1288 174/126.3 |

FOREIGN PATENT DOCUMENTS

| JP | 2007-273671 | 10/2007 |
|---|---|---|
| JP | 2008-252089 | 10/2008 |
| JP | 2010-001174 | 1/2010 |

* cited by examiner

FERRITE GREEN SHEET, SINTERED FERRITE SHEET, FERRITE COMPOSITE SHEET COMPRISING THE SAME, AND CONDUCTIVE LOOP ANTENNA MODULE

FIELD

The present invention relates to a ferrite green sheet used to manufacture a ferrite composite sheet configured to isolate a metal substrate from a radio-frequency identification (RFID) antenna or a near field communication (NFC) antenna, a sintered ferrite sheet, a ferrite composite sheet including the same, and a conductive loop antenna module.

BACKGROUND

New communication methods using RFID or NFC technology have been widely used recently. RFID refers to technology of reading information stored in an electronic tag in a non-contact mode wherein the reading of the information is performed through an antenna or a reader using radio waves. For example, a transportation card may be considered to be an electronic tag, and a transportation card terminal may be considered to be a reader. NFC refers to communication technology of exchanging various kinds of wireless data within a short distance of 10 cm. This technology is non-contact short-range wireless communication technology using a frequency band of 13.56 MHz. The NFC technology has been widely used for handling of information on articles in a supermarket or store, transfer of tourist information for visitors, traffic, and locking devices for access control, as well as for payment, and has a short-range communication distance. As a result, the NFC technology has attracted attention since it has relatively superior security and is inexpensive.

When a product such as a mobile phone is manufactured, a sufficient space is present between a battery and a rear cover of the product. Accordingly, an NFC/RFID loop antenna is installed in this space. In general, since a coil is mounted in the antenna, the flow of an electric current results in formation of a magnetic field, which is then allowed to transfer signals to other sides. For example, when a product such as a credit card, a smartphone, or an electronic wallet is in a dissembled state, the product is configured so that an antenna having a coil mounted therein can be installed in the product to enable the exchange of data stored in the product. However, when the antenna is installed in a battery or a printed circuit board (PCB) so that it is positioned adjacent to a conductive material such as a metal, the antenna reacts with the metal and causes interference, preventing generation of signals.

The problems regarding such interference can be effectively solved by isolating magnetism using a material exhibiting high permeability and having low permeability loss. That is, the material exhibiting high permeability allows signals to travel toward a magnetic material rather than the metal to prevent the interference of the metal. Such a material is generally referred to as an isolator. In general, ferrite is known as a material exhibiting high permeability and having low permeability loss as described above. Also, various methods of manufacturing a ferrite sheet are already known in the related art.

Ferrite sheets used recently have grooves that cross continuously in a certain pattern mode, and the grooves can be compartmentalized by the patterns designed thus. Therefore, the ferrite sheet can be easily handled, and attached to a flat or curved plane. There are many methods used to form such patterns. The most common method is a method of forming a half cut on a green sheet by means of a method using a knife. Meanwhile, a hole drilling method of forming a certain division pattern has been developed recently. Such a method can be useful in manufacturing products having a thickness of less than 0.08 mm.

US 2012/0088070 A1 discloses a composite ferrite sheet having V-shaped grooves arranged in a lattice-type mode, a method of manufacturing a composite ferrite sheet, and a sintered ferrite segment used to form the composite ferrite sheet. Also, Korean Patent Publication No. 10-2008-0082466 discloses a ferrite molded sheet having controlled surface roughness, a sintered ferrite substrate, and an antenna module. All the prior-art documents encounter difficulties in forming precise patterns since the patterns are formed by mechanically applying a pressure onto a green sheet using a knife or drum. Also, since a separate mechanical process is further performed to form the patterns, these processes may be long and complicated, and a bottleneck state may be caused during the entire processes since the separate mechanical process should be performed for a long period of time. In addition, burrs, which are pieces that are broken during a process and are inevitably formed in a mechanical process, necessarily occur in the manufactured ferrite sheet itself, and a situation in which particles break off and are stuck on the ferrite sheet itself may not be avoidable. Further, the shape and size of the grooves cannot be easily controlled since the grooves are formed using the mechanical process.

SUMMARY

Technical Problem

An object of the present invention is to provide a novel ferrite green sheet and a sintered ferrite sheet on which burrs or particles are not formed after molding, a ferrite composite sheet including the same, and an antenna module.

Technical Solution

In order to achieve the above-mentioned object, according to an aspect of the present invention, there is provided a ferrite green sheet having a pattern formed at a top surface thereof wherein the pattern includes a plurality of grooves, and each of the grooves has a round-shaped bottom, which has a radius of curvature R, and a width W. Here, a ratio (W:R) of W to R is in a range of 1:0.1 to 1:0.5.

According to another aspect of the present invention, there is provided a sintered ferrite sheet having a pattern formed at a top surface thereof wherein the pattern includes a plurality of grooves, and each of the grooves has a round-shaped bottom, which has a radius of curvature R, and a width W. Here, a ratio (W:R) of W to R is in a range of 1:0.1 to 1:0.5.

According to still another aspect of the present invention, there is provided a ferrite composite sheet including the sintered ferrite sheet.

According to yet another aspect of the present invention, there is provided a conductive loop antenna module including a magnetic member including the sintered ferrite sheet, a conductive loop antenna installed at one surface of the magnetic member, and a conductive layer installed opposite to the surface of the magnetic member having the conductive loop antenna formed therein. Here the conductive loop antenna module is used in wireless communication media and wireless communication medium processing apparatuses.

Advantageous Effects

According to the present invention, a novel ferrite green sheet in which burrs are not formed and particles do not break off can be provided. Unlike the conventional ferrite green sheets in which grooves are formed using a knife or a hole drill, the ferrite sheet according to the present invention can be manufactured with high productivity without causing a bottleneck state during a process since the grooves are formed by tape casting. In addition, since the pattern is not directly formed on a cured green sheet, but formed in a flexible state using a peel sheet having a pattern formed therein by means of a tape casting method, the pattern can be formed more easily. Furthermore, according to one exemplary embodiment of the present invention, the problems regarding formation of air bubbles caused upon attachment to a final product can be prevented.

DETAILED DESCRIPTION OF THE INVENTION

Figure 1A:
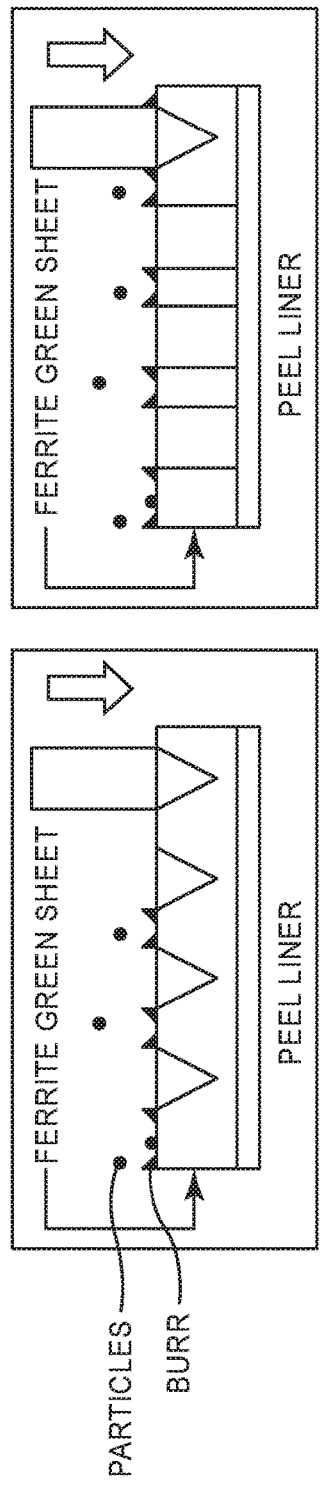
FIG. 1a shows a ferrite sheet according to the prior art in which grooves are formed using a blade (left) or a hole drill (right).

Hereinafter, exemplary embodiments of the present invention will be described in detail below with reference to the accompanying drawings.

One exemplary embodiment of the present invention provides a ferrite green sheet having a pattern formed on a top surface thereof wherein the pattern includes a plurality of grooves, and each of the grooves has a round-shaped bottom, which has a radius of curvature R, and a width W. Here, a ratio (W:R) of W to R is in a range of 1:0.1 to 1:0.5.

Here, the pattern is preferably a lattice-type pattern. Also, the pattern may be formed by coating a ferrite slurry on a patterned peel liner and drying the ferrite slurry.

Also, the ferrite slurry preferably includes a ferrite powder, a solvent, a dispersing agent, a binder, and a plasticizer.

The ferrite powder is preferably a powder of soft spinel ferrite. The ferrite powder is more preferably a powder of Ni—Zn—Cu-based spinel ferrite or Mg—Zn—Cu-based spinel ferrite. The powder of Ni—Zn—Cu-based spinel ferrite preferably has a composition including $Fe_2O_3$ at 40 to 50 mole %, NiO at 10 to 30 mole %, ZnO at 10 to 30 mole %, and CuO at 0 to 20 mole %, based on the total amount of the composition. The powder of Mg—Zn—Cu-based spinel ferrite preferably has a composition including $Fe_2O_3$ at 40 to 50 mole %, MgO at 15 to 35 mole %, ZnO at 5 to 25 mole %, and CuO at 0 to 20 mole %, based on the total amount of the composition. A crystallized ferrite powder may be obtained by uniformly mixing a powdery oxide source, followed by calcining the oxide source at 750° C. to 950° C. for 2 hours and milling the calcined oxide source. It is desirable to use a ferrite powder having a cumulative 50% volume particle size of 0.5 to 1.5 μm.

The solvent that may be used herein may include a glycol ether-based solvent, MEK, toluene, methanol, ethanol, n-butanol, and the like.

A dispersing agent, such as a copolymer, known in the related art may be used as the dispersing agent.

The binder that may be used herein preferably includes a thermoplastic resin such as polyethylene, polypropylene, or polyvinyl butyral, and a thermoplastic elastomer such as a styrene-, ethylene-, butylene- or olefin-based elastomer, which may be used alone or in combination. Preferably, polyvinyl butyral and polybutylmethacrylate may be used.

The plasticizer that may be used herein preferably includes bis(2-ethylhexyl)phthalate and butyl butyl phthalate.

The ferrite substrate according to the present invention has a pattern formed at a top surface thereof. The pattern includes a plurality of grooves. Each of the grooves installed at the top surface of the ferrite substrate has a round-shaped bottom. When it is assumed that R represents a radius of curvature of the round-shaped bottom and W represents a width of each of the grooves, each of the grooves has a ratio (W:R) of W to R ranging from 1:0.1 to 1:0.5. When the ratio (W:R) of W to R is greater than or equal to 1:0.1, the grooves are formed in a round shape, which is distinguished from a V shape of each conventional groove in which burrs or particles are formed. On the other hand, when the ratio (W:R) of W to R is less than or equal to 1:0.5, stress is not distributed, thereby facilitating a breaking work.

Gaps between the grooves may be in a range of 2 mm to 4 mm. When the gaps between the grooves are greater than or equal to 2 mm, the ferrite substrate exhibits excellent permeability and processability, whereas the ferrite substrate exhibits excellent flexibility when the gaps between the grooves are less than or equal to 4 mm.

Figure 1B:
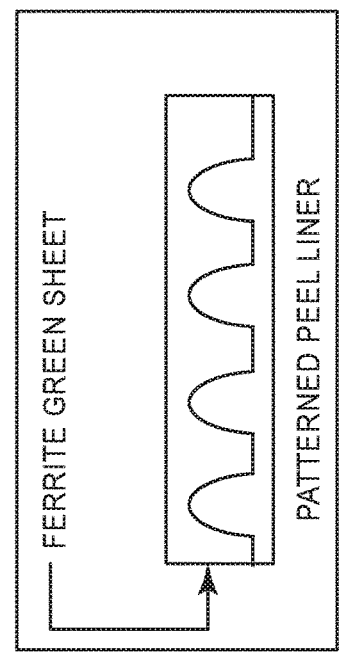
FIG. 1b shows a ferrite sheet according to one exemplary embodiment of the present invention in which grooves are formed on a ferrite green sheet using a patterned peel liner having grooves already formed therein.

As shown in FIG. 1a, in the prior-art technology of forming grooves in a ferrite green sheet using a blade (left panel) or a drill (right panel), the breakaway of burrs or particles was essentially caused since the ferrite green sheet itself had a hard structure. On the other hand, as shown in FIG. 1b, when a ferrite green sheet is manufactured using a patterned peel liner in which grooves are formed in advance according to one exemplary embodiment of the present invention, burrs may not be formed, and the breakaway of particles may be prevented. As a result, an increase in yield and improvement of productivity may be achieved. According to the present invention, a green sheet having grooves formed therein is manufactured by subjecting a patterned peel liner to liquid coating. In this case, a more precise and elaborate pattern may be formed according to the present invention using a more simple process.

Figure 2:
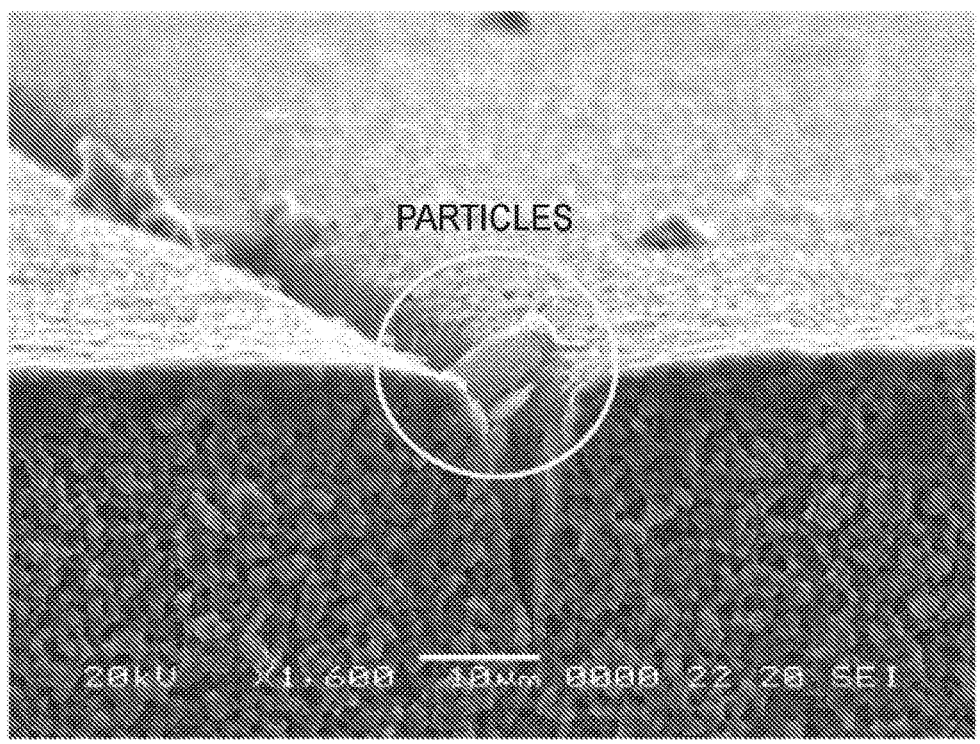
FIG. 2 shows a scanning electron microscope (SEM) image of a ferrite green sheet according to the prior art.

FIG. 2 shows the SEM image of a ferrite green sheet according to the prior art. As shown in FIG. 2, V-shaped grooves are formed on a ferrite sheet, and a plurality of particles are present in each of the grooves.

Figure 3A:
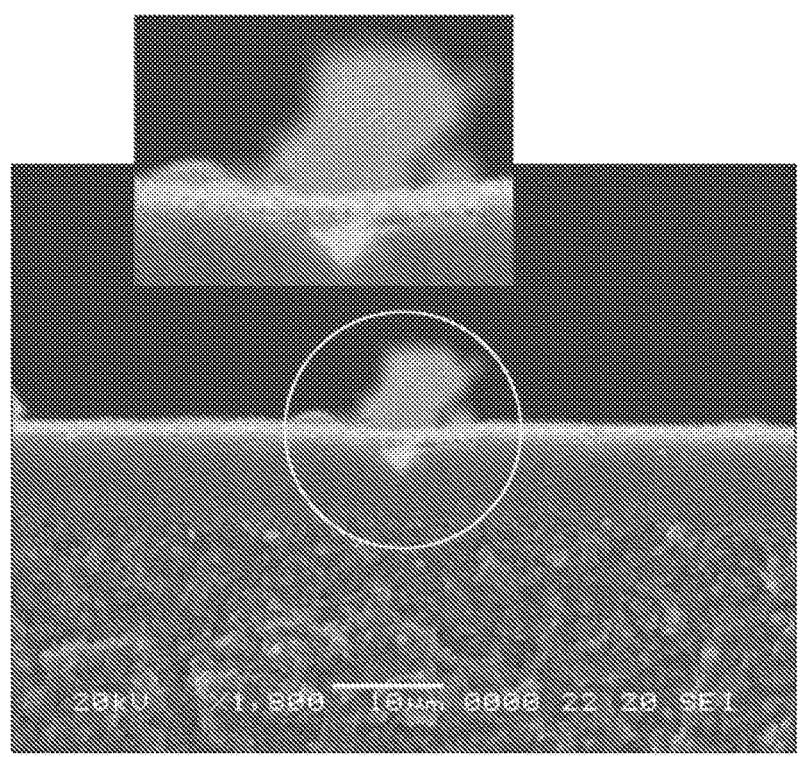
FIG. 3a shows another SEM image of a ferrite green sheet according to the prior art.
Figure 3B:
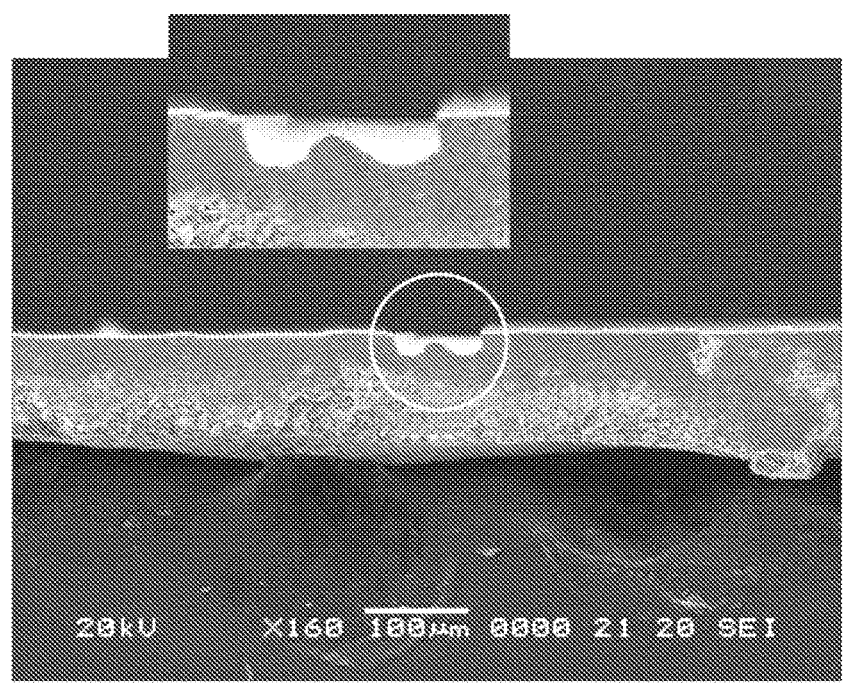
FIG. 3b shows the SEM image of a ferrite green sheet according to one exemplary embodiment of the present invention.

Referring now to the SEM image, the ferrite green sheet according to the prior art has V-shaped grooves formed at a top surface thereof, as shown in FIG. 3a. On the other hand, the ferrite green sheet according to the present invention has round-shaped grooves, as shown in FIG. 3b.

Figure 4:
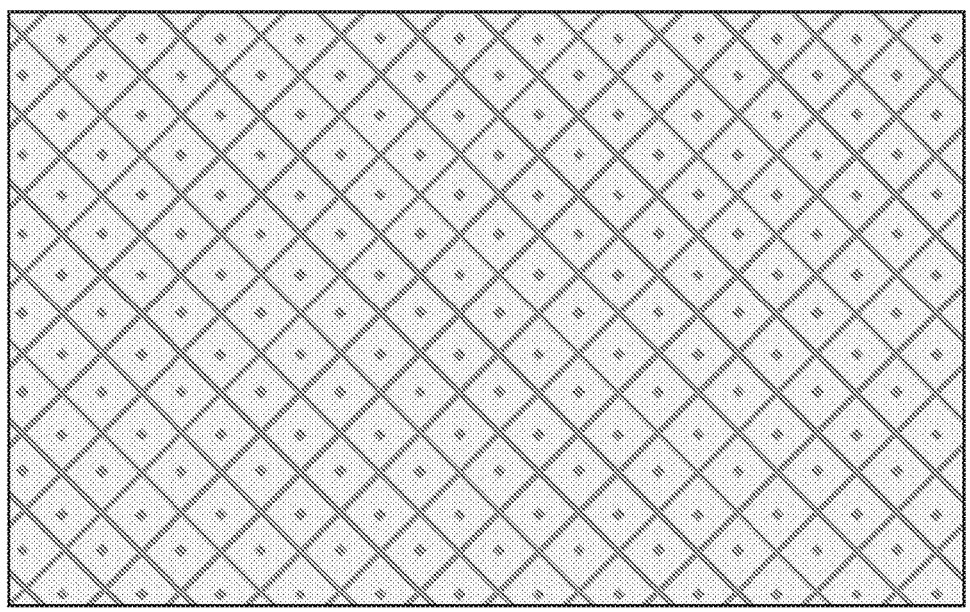
FIG. 4 shows a patterned peel liner configured to provide grooves in a ferrite green sheet.

A patterned peel liner configured to provide grooves in a ferrite green sheet is shown in FIG. 4. As shown in FIG. 4, since grooves arranged in a lattice-type mode are present in the peel liner, liquid coating may be performed using the peel liner in order to manufacture a green sheet having round-shaped grooves, as shown in FIGS. 1b and 3b. In this case, the pattern of the peel liner shown in FIGS. 1b and 3b may be spontaneously printed onto the green sheet (see FIGS. 5 and 6).

This method does not require a separate process (i.e., a mechanical process) to form a pattern on the ferrite green sheet. According to the prior art, since a green sheet is first manufactured and a pattern is then formed on a surface of the green sheet by additionally applying a pressure to the green sheet using a knife or a hole drill, a separate mechanical process for forming a pattern is required. Also, according to the prior art, since a batch process should be performed to form a pattern having fine gaps, the entire process speed may be slow, and a bottleneck state may be caused throughout the processes of manufacturing a ferrite sheet. Also, small particles may be broken away while a knife is allowed to physically contact the green sheet. On the other hand, when a ferrite sheet is manufactured according to the present invention, productivity may be enhanced and a more precise surface of the ferrite sheet may be formed upon manufacture of the ferrite sheet, which results in a decrease in overall manufacturing costs. According to the present invention, a half cut process is not required, and the breakaway of particles basically does not take place. That is, the present invention does not require a separate mechanical process since a slurry in a liquid state is cast, that is, coated on a peel liner having a pattern formed therein, and a pattern is spontaneously formed at the same time. Also, since the process is carried out when the slurry is in a flexible state before a sintering process, it is easy to handle, and it is possible to optionally control formation of the pattern.

Figure 7:
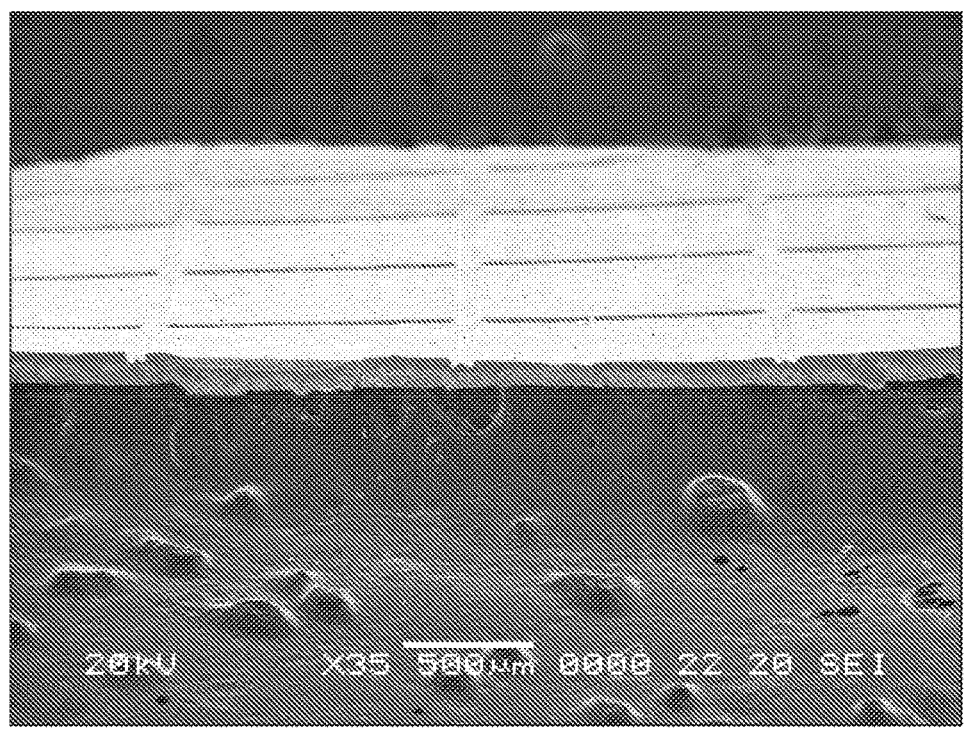
FIG. 7 shows a ferrite green sheet having a lattice-type pattern according to one exemplary embodiment of the present invention.

As shown in FIG. 7, the pattern formed on the ferrite green sheet of the present invention is preferably a lattice-type pattern. Arranging a plurality of grooves in a lattice-type mode is realized to perform a breaking task for making ferrite flexible. When a plurality of grooves arranged in a lattice-type mode are formed on a surface of a product like a bar of chocolate, the product may be cut according to the pattern, and a breaking task can thereby be performed uniformly.

Another exemplary embodiment of the present invention provides a ferrite green sheet having a pattern formed at a top surface thereof wherein the pattern includes a concave portion extending therefrom, and the concave portion has a round-shaped bottom having a radius of curvature R and a top surface having a width W. Here, a ratio (W:R) of W to R is in a range of 1:0.1 to 1:0.5.

Except that the pattern includes the concave portion rather than the grooves, the above-described ferrite green sheet according to one exemplary embodiment of the present invention is as described above.

Still another exemplary embodiment of the present invention provides a sintered ferrite sheet having a pattern formed at a top surface thereof wherein the pattern includes a plurality of grooves, and each of the grooves has a round-shaped bottom, which has a radius of curvature R, and a width W. Here, a ratio (W:R) of W to R is in a range of 1:0.1 to 1:0.5.

In this case, the pattern is preferably a lattice-type pattern, and the pattern may be formed by coating a ferrite slurry, which includes a ferrite powder, a solvent, a dispersing agent, a binder, and a plasticizer, on a patterned peel liner and drying the ferrite slurry.

Here, the ferrite powder is as already described above.

The sintered ferrite sheet preferably has a magnetic permeability with a real part ur' of 80 or more and an imaginary part ur" of 20 or less at 13.56 MHz. Also, the sintered ferrite sheet preferably has a real permeability ur' of 80 or more and an imaginary permeability ur" of 100 or less at 13.56 MHz.

When the ferrite powder is a powder of Ni—Zn—Cu-based spinel ferrite, the real permeability ur' and the imaginary permeability ur" at 13.56 MHz may be maintained at constant values of 80 or more and 20 or less, respectively. This is because the sintered ferrite is endowed with suitable flexibility. In this case, the sintered ferrite also has very excellent properties as a thin-film sintered ferrite substrate for a loop antenna module, which has a thickness of 25 to 360 μm.

When the ferrite powder is a powder of Mg—Zn—Cu-based spinel ferrite, the real permeability ur' and the imaginary permeability ur" at 13.56 MHz may be maintained at constant values of 80 or more and 100 or less, respectively. This is because the sintered ferrite is endowed with suitable flexibility. In this case, the sintered ferrite also has very excellent properties as a thin-film sintered ferrite substrate for a loop antenna module, which has a thickness of 25 to 360 μm.

The real permeability represents how well a magnetic field travels, and the imaginary permeability represents a degree of loss of the magnetic field. An ideal material is a material exhibiting high permeability and having low permeability loss.

The ferrite sheet having the above-described permeability may be used as a magnetic member suitable for use for antenna modules, which contributes to manufacturing a thin-film antenna module.

Figure 6:
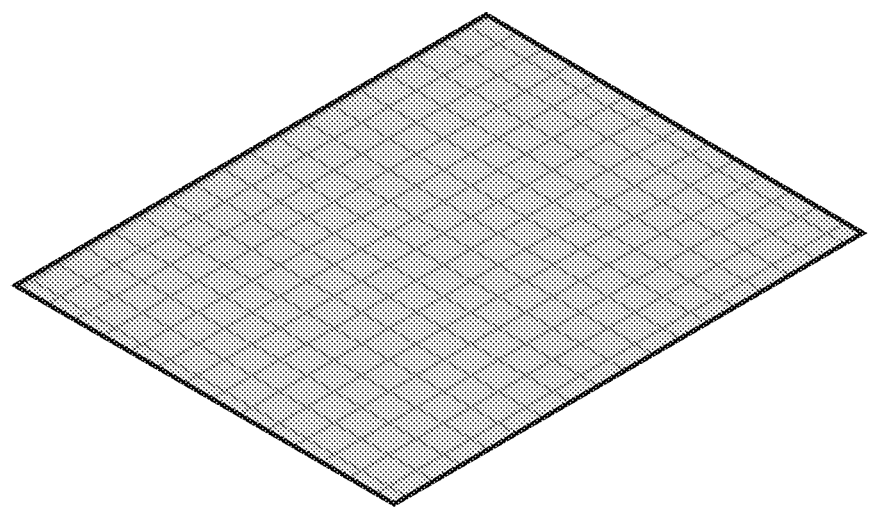
FIG. 6 shows a sintered ferrite sheet having a pattern formed therein according to one exemplary embodiment of the present invention.

The structure of a sintered ferrite sheet having a pattern formed therein is shown in FIG. 6.

A sintered ferrite sheet may be manufactured by forming a ferrite green sheet having a pattern formed thereon, and sintering the ferrite green sheet in a calcining furnace. This is substantially similar to a process of cutting a clay dough to form grooves and curing the clay dough in a firing oven. The calcination is performed after 5 to 20 ferrite green sheets are stacked on an alumina plate. For calcination conditions, removal of resin components using an electric furnace and growth of ferrite particles should be taken into account. The removal of the resin components may be performed at 150° C. to 550° C. for 5 to 80 hours, and the growth of the ferrite particles may be performed at 850° C. to 1,200° C. for 1 to 5 hours.

To prevent thermal deformation or breaking of the ferrite sheet, the removal of the resin components may be performed at room temperature to a predetermined temperature after the ferrite sheet is heated at a heating rate of 10° C. to 20° C. per hour. Thereafter, the ferrite sheet may be heated at a heating rate of 30° C. to 60° C. per hour, and sufficiently sintered at a constant temperature to grow ferrite particles, which are then cooled slowly. The maintenance temperature or time required for each process may be optimally set according to the number of ferrite sheets to be processed.

The other patterns and grooves are as described above for the ferrite green sheet.

Still another exemplary embodiment of the present invention provides a ferrite composite sheet including the sintered ferrite sheet. The ferrite composite sheet may further include one or both of a pressure-sensitive adhesive layer and a conductive layer formed at one or both surfaces of the sintered ferrite sheet. The ferrite composite sheet may be preferably configured to include a pressure-sensitive adhesive layer, a conductive layer stacked on the pressure-sensitive adhesive layer, a sintered ferrite sheet stacked on the conductive layer, a pressure-sensitive adhesive layer stacked on the sintered ferrite sheet, and a protective film stacked on the pressure-sensitive adhesive layer. A pressure-sensitive adhesive may be used as the pressure-sensitive adhesive layer. A breaking work is carried out to make a ceramic such as ferrite flexible. In this case, a pressure-sensitive adhesive tape may be stacked on/under a sintered ferrite sheet so as to prevent scattering of the ceramic (i.e., the sintered ferrite sheet). Since the sintered ferrite sheet itself may be easily broken, a tape may be attached to the sintered ferrite sheet to improve workability and flexibility.

Figure 10:
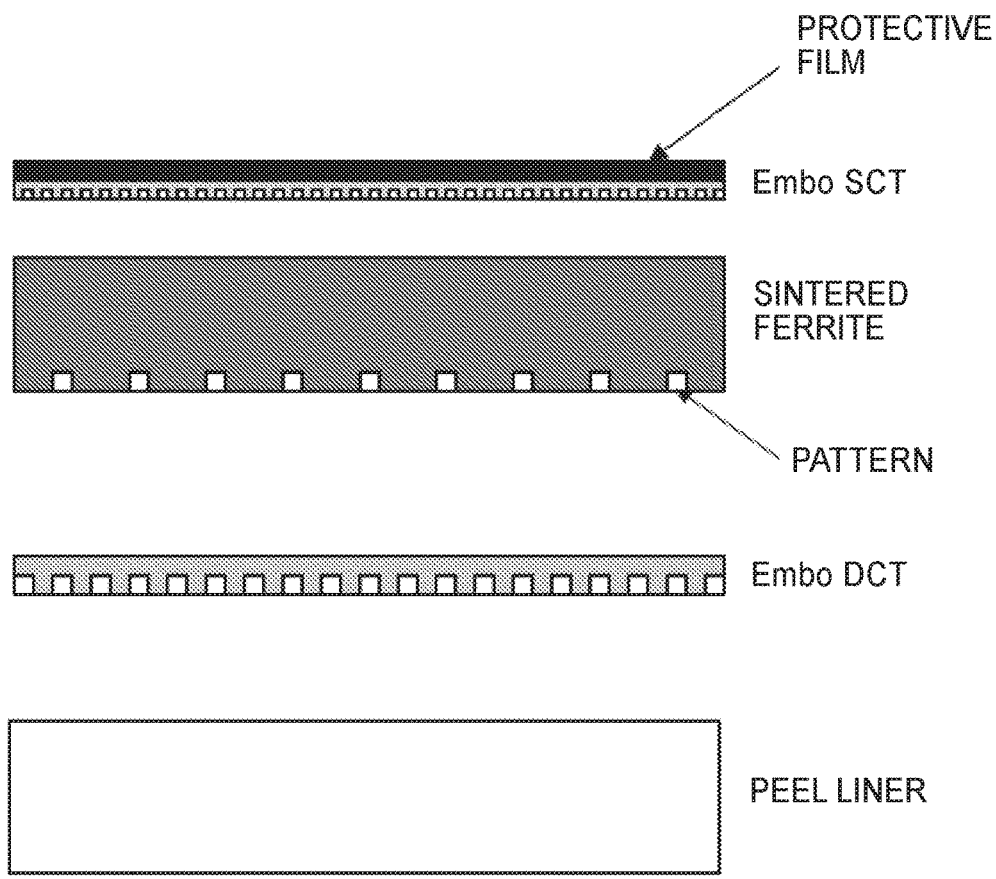
FIG. 10 shows a ferrite composite sheet including an embossed pressure-sensitive adhesive tape according to one exemplary embodiment of the present invention.

Here, the pressure-sensitive adhesive tape may preferably include an air-containing portion. For example, an embossed tape may be used as the pressure-sensitive adhesive tape including such an air-containing portion. The embossed tape serves to accommodate air bubbles or foam that may be generated between the sintered ferrite and the substrate (an antenna or a battery). Therefore, the problems regarding the air bubbles that may be caused in the final products may be solved. The embossed tape may be attached to one or both surfaces of the sintered ferrite sheet. It is more desirable to attach the embossed tape to both surfaces of the sintered ferrite sheet. This is because air bubbles may always be generated between layers. An embossed single-coated film (EMBO SCT) or an embossed dual-coated film (EMBO DCT) may be used as the embossed tape. Preferably, the embossed single-coated film may be attached to a top surface of the sintered ferrite sheet (a surface in which the protective film is attached onto the pressure-sensitive adhesive layer), and the embossed dual-coated film may be attached to a bottom surface of the sintered ferrite sheet (a surface in which the peel liner is attached to the pressure-sensitive adhesive layer) (see FIG. 10). By doing this, the problems regarding the formation of air bubbles in the final product can be prevented (see FIGS. 11a and 11b).

Yet another exemplary embodiment of the present invention provides a conductive loop antenna module including a magnetic member including the sintered ferrite sheet, a conductive loop antenna installed at one surface of the magnetic member, and a conductive layer installed opposite to the surface of the magnetic member having the conductive loop antenna formed therein. The conductive loop antenna module may be used in wireless communication media and wireless communication medium processing apparatuses.

Here, the magnetic member may be a Ni—Zn—Cu-based spinel ferrite-sintered substrate, or a Mg—Zn—Cu-based spinel ferrite-sintered substrate.

The conductive loop antenna may be manufactured by forming a conductive loop having a thickness of 20 to 30 μm on one surface of an insulation film having a thickness of 20 to 60 μm such as a polyimide film or a PET film. Here, the conductive loop may be in a spiral shape.

The conductive layer may be formed by applying an acrylic or epoxy-based conductive paint, or formed by printing and laminating a silver paste onto a ferrite molded sheet and integrally calcining the ferrite molded sheet. As such, the conductive layer may preferably have a thickness of 50 μm or less and a surface electric resistivity of 3Ω/□ or less.

A paint obtained by dispersing a powder of copper and silver, which serves as a conductive filler, in an organic solvent such as butyl acetate or toluene, an acrylic resin, or an epoxy resin may be used as the conductive paint.

The sintered ferrite substrate to which a conductive layer is attached may be obtained by forming a conductive paste according to a green sheet method and integrally calcining the conductive paste. To prevent the conductive layer from being exposed inside electronic equipment, an insulating protective film may be stacked on the conductive layer. Condensers are inserted into a loop in parallel, and a resonance frequency is adjusted to 13.56 MHz so as to allow the manufactured antenna module to resonate at desired frequencies.

As described above, even when the antenna module, in which the conductive loop antenna, the pressure-sensitive adhesive layer, the ferrite sintered substrate, and the conductive layer are closely adhered and integrated and the condensers are introduced into a loop circuit in parallel so as to adjust the resonance frequency to 13.56 MHz, is installed in the vicinity of metal members of various types of electronic equipment, a stable communication environment may be ensured due to a very small change in antenna characteristics. The antenna module may be used in a non-contact IC tag using the RFID/NFC technology.

The ferrite green sheet is manufactured using a method including the following operations:
preparing a ferrite powder;
forming a ferrite slurry by mixing the ferrite powder with a binder, a plasticizer, a solvent, and a dispersing agent; and
forming a ferrite green sheet having grooves formed therein by coating the ferrite slurry on a patterned peel liner using a tape casting method, and drying the ferrite slurry.

When the ferrite powder is mixed with the binder, the plasticizer, the solvent, and the dispersing agent to form the ferrite slurry, a ball mill may be used. When the solvent and the ferrite powder are first filled and mixed and the binder and the plasticizer are then added, the ferrite slurry may be uniformly obtained. The resulting slurry may be sufficiently degassed under a reduced pressure in a vacuum container so as to prevent cracks from occurring during the coating and drying processes.

A tape casting method is used upon coating of the ferrite slurry. Among ceramic products, especially electronic ceramic products, there are many very thin plate-shaped products. For example, each of the very thin plate-shaped products may include a substrate, a multilayer chip capacitor (MLCC), a multilayer inductor, a thermistor, a fuel cell, and the like. Among methods used as plate-shaped ceramic molding methods, a method which has been most widely used is the tape casting method. This method is a method of obtaining a tape-type molded product by mixing a fine ceramic powder with a liquid-phase solvent such as alcohol or water to form a slurry, thinly plating the slurry on an underlying tape (i.e., a stainless steel tape, an oilpaper tape, or a polymer tape such as MYLAR or ACLAR) using a tape caster, volatilizing the solvent, and removing a film of the slurry from the underlying tape.

Also, the ferrite composite sheet is manufactured using a method including the following operations:

preparing a ferrite powder;

forming a ferrite slurry by mixing the ferrite powder with a binder, a plasticizer, a solvent, and a dispersing agent;

forming a ferrite green sheet having grooves formed therein by coating the ferrite slurry on a patterned peel liner using a tape casting method, and drying the ferrite slurry;

peeling the patterned peel liner from the ferrite green sheet and sintering the ferrite green sheet; and forming a ferrite composite sheet by stacking a pressure-sensitive adhesive on both surfaces of the sintered ferrite sheet, stacking a protective film on one surface of the pressure-sensitive adhesive and stacking a peel liner on the other surface of the pressure-sensitive adhesive.

EXAMPLES (1) Preparation of Ferrite Powder

A Ni—Zn ferrite powder having the following composition was prepared.

$(Ni_{0.2}Zn_{0.5}Cu_{0.15})(Fe_2O_4)_{0.97}$ plus 0.3 wt % $Bi_2O_3$, 1 wt % $Co_3O_4$, and 0.3 wt % $Cr_2O_3$ A crystal structure of particles was analyzed using X-ray diffractometry. As a result, it was confirmed that the particles had a spinel structure. The average particle size of the particles was in a range of 0.3 μm to 2.0 μm.

(2) Preparation of Ferrite Slurry (A) Ferrite Slurry Source

To prepare a ferrite slurry, a binder resin, a solvent, and a plasticizer were added at the following contents (see the following Table 1)

TABLE 1

| | Batch A for primary mixing | | | Batch B for secondary mixing | | |
|---|---|---|---|---|---|---|
| Mixing | Ferrite powder | Toluene | Dispersing agent | Binder | Plasticizer | Ethanol |
| (% by weight) | 57.41 | 25.83 | 0.69 | 4.02 | 1.72 | 10.33 |

Binder: poly(vinyl butyral) (CAS No. 63148-65-2)
Plasticizer: bis(2-ethylhexyl) phthalate (CAS No. 117-81-7)
Solvent: toluene (CAS No. 108-88-3), ethanol (CAS No. 64-17-5)
Dispersing agent: Hypermer KD1-SO from Croda Europe Ltd.

(B) Mixing Method

Primary mixing was performed by optimally suspending a ferrite powder to form a slurry. When the primary mixing was completed, secondary mixing was performed. The mixing conditions used in the primary and secondary mixings are listed in the following Table 2.

TABLE 2

| | Material | Jar volume | Steel ball media | Time |
|---|---|---|---|---|
| Primary mixing | Batch A | 6-L ball mill | ¢10 | 5 hours phi |
| Secondary mixing | Batch B | | | 19 hours |

(3) Tape Casting Method of Forming Grooves on a Ferrite Green Sheet

Figure 5:
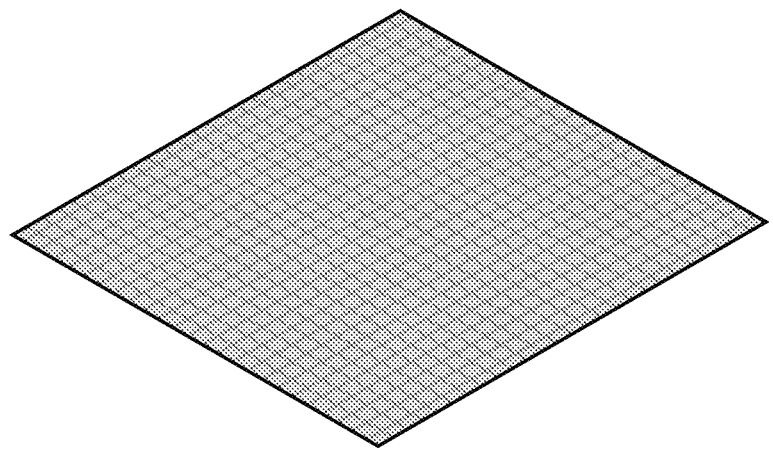
FIG. 5 shows a ferrite green sheet having a pattern formed therein according to one exemplary embodiment of the present invention.

When a sintered ferrite product was manufactured according to the prior art, grooves were mainly mechanically formed with a blade or a drum having grooves formed therein prior to a sintering process. On the other hand, according to the present invention, groove formation and tape casting may be performed at the same time. This is because a patterned peel liner is used. In particular, the tape casting method of the present invention may aid in increasing the yield of the final product and improving the productivity, compared to the conventional method of mechanically forming grooves. This is because ferrite particles or burrs are formed on a surface of the ferrite green sheet according to the prior art (see FIGS. 1a, 2, and 3a), but such particles or burrs are not formed according to the present invention (see FIGS. 1b and 3b), and a separate process of mechanically forming grooves is not required after tape casting. For reference, the left panel of FIG. 1a shows a ferrite green sheet whose grooves are formed using a blade, the right panel of FIG. 1a shows a ferrite green sheet whose grooves are formed using hole drilling, and FIG. 1b shows a ferrite green sheet whose pattern is formed using a patterned peel liner according to the present invention. The pattern of grooves formed on the ferrite green sheet as shown in FIG. 1b is shown in FIG. 5.

To manufacture a ferrite green sheet, the ferrite slurry was coated on a silicone-coated patterned liner using a tape caster, and dried to manufacture a ferrite green sheet having a thickness of 50 to 200 μm.

A slurry coating rate was in a range of 2 to 5 m/minute, a temperature of a drying furnace was in a range of 60° C. to 80° C., and a drying time was 5 minutes. The drying conditions were associated with the boiling points of organic solvent components used in the ferrite slurry. From the tape casting results, it was confirmed that the ferrite green sheet had a green density of 3.5 g/cm³ to 3.8 g/cm³.

To control the magnetic permeability of the sintered ferrite plate and the depth and length of each groove, various patterns of grooves are determined before a sintering process using a patterned peel liner (see FIG. 4). FIG. 4 shows a patterned peel liner configured to form grooves on the ferrite green sheet. SRF characteristics and qualities of the ferrite sheet at 13.56 MHz may be improved by controlling the magnetic permeability of a ferrite plate. Also, the shape of grooves affects excellent mechanical properties so that stress caused by a driving power can be lowered during a sintering process. In addition, when the protective film is laminated, flexibility may be improved, and formation of air bubbles may be inhibited.

(4) Sheet Lamination

To manufacture a green sheet having a higher thickness, a sheet laminating process is additionally performed. In this case, a desired thickness of the ferrite green sheet should be determined in consideration of the shrinkage rate of the ferrite green sheet. In general, the shrinkage rate of the ferrite green sheet is in a range of 25% to 15% in the Z axis, and in a range of 5% to 15% in the XY axes.

(5) Iso-Pressing

To maximize the green density of the ferrite green sheet and prevent the ferrite green sheet from crumpling during a sintering process, an iso-pressing process is required. However, the iso-pressing process may be omitted according to a situation.

(6) Ferrite Sintering

The ferrite green sheet is detached from the silicone-coated patterned peel liner. The ferrite green sheet is sintered in a calcining furnace to perform combustion of a binder and densification of ferrite particles. The sintered ferrite sheet having grooves formed therein is shown in FIG. 6.

(7) Tape Lamination

A protective tape is attached to top and bottom surfaces of the sintered ferrite sheet. Since the sintered ferrite sheet itself is easily broken, the protective tape may be attached to the sintered ferrite sheet to improve workability and flexibility. A pressure-sensitive adhesive used in the protective tape includes an air layer configured to exhaust air between the sintered ferrite sheet and the substrate.

Figure 11A:
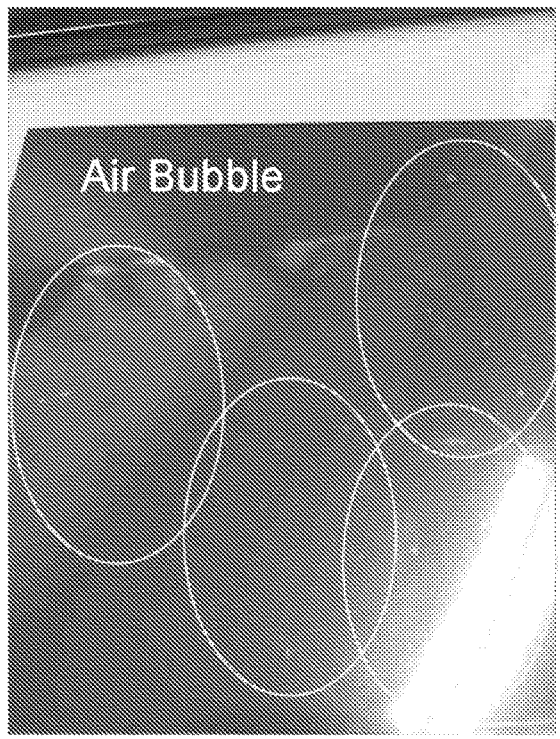
FIG. 11a shows that air bubbles are generated when using a sheet including an unembossed pressure-sensitive adhesive tape.
Figure 11B:
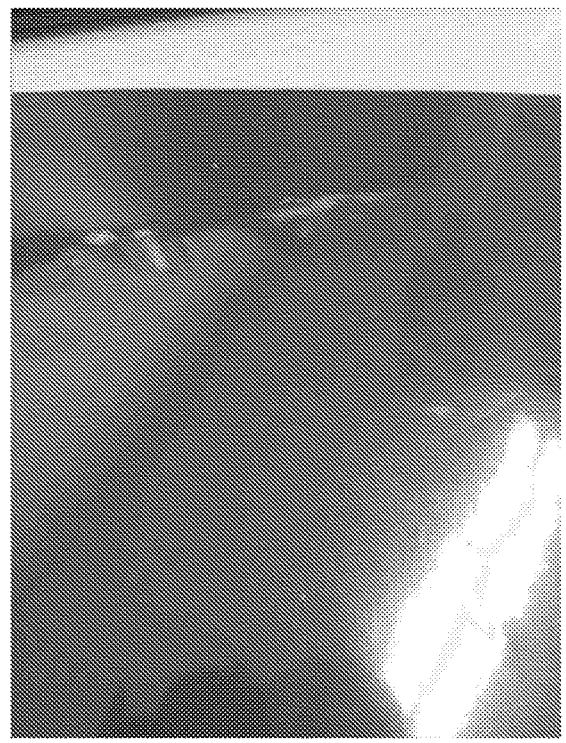
FIG. 11b shows that air bubbles are not generated in a final product when using a ferrite composite sheet including an embossed pressure-sensitive adhesive tape according to one exemplary embodiment of the present invention.

When the ferrite sheet is manufactured, assembled into an antenna, and attached to a battery pack after removal of a liner, air bubbles may be formed in the final product. By using an embossed protective tape including such an air layer, the air bubbles in the final product may be removed according to the present invention. Referring to FIGS. 11a and 11b, it could be seen that the use of the embossed protective tape (FIG. 11b) prevented formation of air bubbles, but the use of an unembossed protective tape (FIG. 11a) resulted in formation of air bubbles.

(8) Ferrite Composite Sheet

Figure 8:
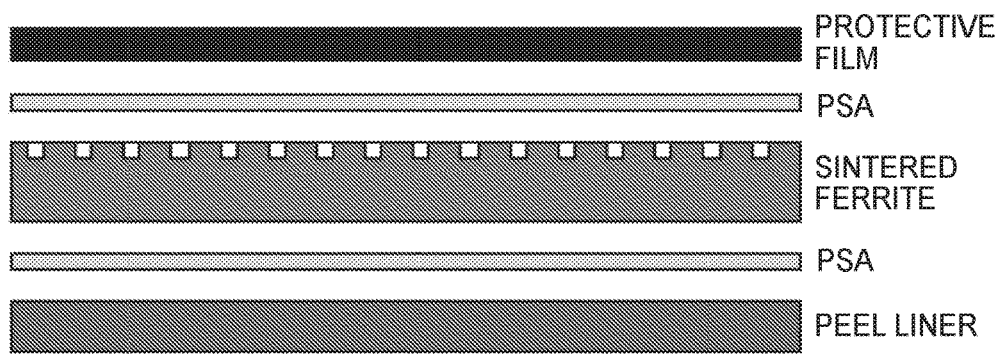
FIGS. 8 and 9 show ferrite composite sheets including a hard-coated protective layer, a patterned ferrite sheet, and an acrylic pressure-sensitive adhesive (PSA) together with a peel liner according to one exemplary embodiment of the present invention.
Figure 9:
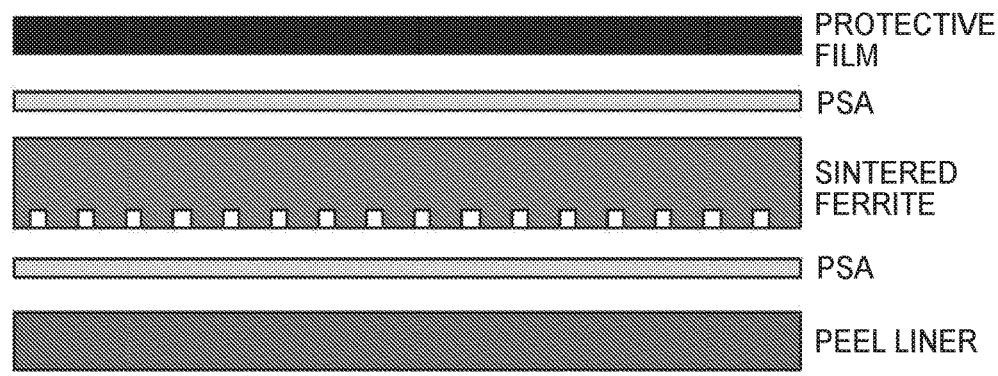

To further protect a thin ferrite sheet during a process of transportation, die-cutting, and stacking, a product was manufactured in a sandwich structure so that the product included a hard-coated protective layer, a patterned ferrite sheet, and an acrylic pressure-sensitive adhesive (PSA) together with a peel liner. This is because formation of air bubbles may be avoided during a stacking process. The structures of the ferrite composite sheets are shown in FIGS. 8 and 9.

(9) Measurement of Permeability

Figure 12:
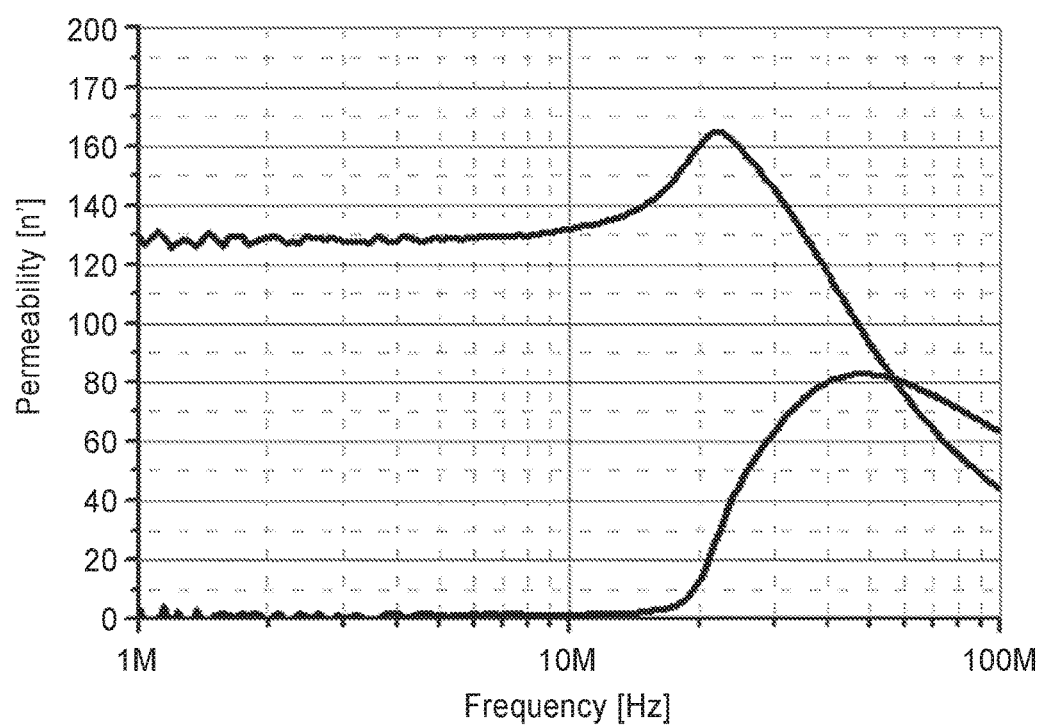
FIG. 12 shows the permeability characteristics of a ferrite sheet having grooves formed therein.
Figure 13A:
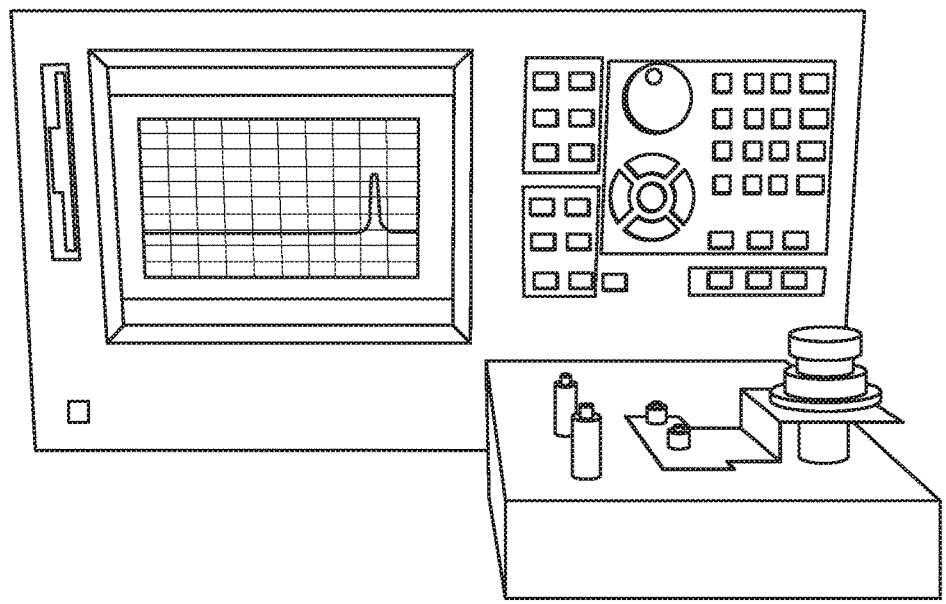
FIG. 13 shows an Agilent E4991A RF Impedance/Material Analyzer (FIG. 13a) and a 16454A Fixture (FIG. 13b) used to measure the permeability characteristics of a soft magnetic material.
Figure 13B:
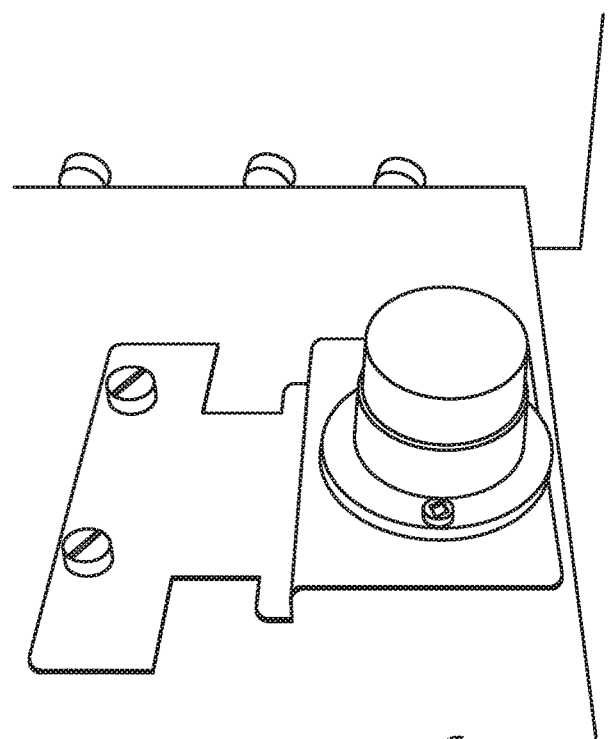

A ferrite sheet having grooves formed therein was measured for permeability at a frequency of 13.56 MHz. The graph obtained thus is shown in FIG. 12. FIG. 12 shows the permeability characteristics of a ferrite sheet having patterns formed therein. In general, the permeability characteristics of the soft magnetic material can be measured, and the permeability can be analyzed using an RF impedance/material analyzer (commercially available from Agilent Technologies, Inc.; see FIG. 13a) and a 16454A fixture (see FIG. 13b).

From the foregoing, it will be appreciated that various embodiments of this invention have been described herein for purposes of illustration, and that various modifications may be made without departing from the scope and spirit of this invention.

Accordingly, the various embodiments disclosed herein are not intended to be limiting, with the true scope and spirit being indicated by the following claims.

What is claimed is:

1. A ferrite green sheet comprising:
    a pattern formed in a top surface of the ferrite green sheet, the pattern comprising a plurality of grooves, each groove having a width W and a rounded shape bottom having a radius of curvature R,
    wherein a ratio (W:R) of W to R is in the range of 1:0.1 to 1:0.5.

2. The ferrite green sheet of claim 1, wherein the pattern is a lattice-type pattern.

3. The ferrite green sheet of claim 1, wherein the pattern is formed by coating a ferrite slurry comprising a ferrite powder, a solvent, a dispersing agent, a binder, and a plasticizer, on a patterned peel liner and drying the ferrite slurry.

4. The ferrite green sheet of claim 3, wherein the ferrite powder is a powder of soft spinel ferrite.

5. A sintered ferrite sheet comprising:
    a pattern formed in a top surface thereof,
    wherein the pattern comprises a plurality of grooves, and each of the grooves has a round-shaped bottom, which has a radius of curvature R, and a width W, wherein a ratio (W:R) of W to R is in a range of 1:0.1 to 1:0.5.

6. The sintered ferrite sheet of claim 5, having a magnetic permeability with a real part ur' and imaginary part ur" of not less than 80 and not greater than 20, respectively, at 13.56 MHz.

7. The sintered ferrite sheet of claim 5, having a magnetic permeability with a real part ur' and imaginary part ur" of not less than 80 and not greater than 100, respectively, at 13.56 MHz.

8. The sintered ferrite sheet of claim 5,
    wherein the pattern is a lattice-type pattern, and
    the pattern is formed by coating a ferrite slurry including a ferrite powder, a solvent, a dispersing agent, a binder, and a plasticizer on a patterned peel liner and drying the ferrite slurry,
    wherein the ferrite powder is a powder of Ni—Zn—Cu-based spinel ferrite, and the sintered ferrite sheet has a magnetic permeability with a real part ur' and imaginary part ur" of not less than 80 and not greater than 20, respectively, at 13.56 MHz, or the ferrite powder is a powder of Mg—Zn—Cu-based spinel ferrite, and the sintered ferrite sheet has a magnetic permeability with a real part ur' and imaginary part ur" of not less than 80 and not greater than 100, respectively, at 13.56 MHz.

9. A ferrite composite sheet comprising the sintered ferrite sheet of claim 5.

10. The ferrite composite sheet of claim 9, comprising:
    an adhesive layer formed on the sintered ferrite sheet;
    a protective film formed on the adhesive layer; and
    a conductive layer provided on the opposite side of the sintered ferrite sheet from the adhesive layer.

11. The ferrite composite sheet of claim 10, wherein at least one adhesive layer comprises an air-containing portion.

12. The ferrite composite sheet of claim 10, wherein at least one of the adhesive layers comprises an embossed coating film.

13. The ferrite composite sheet of claim 9, comprising:
- a first adhesive layer formed on the sintered ferrite sheet;
- a protective film formed on the adhesive layer;
- a conductive layer formed provided on the opposite side of the sintered ferrite sheet from the first adhesive layer; and
- a second adhesive layer provided under the conductive layer.

14. A conductive loop antenna module for use in a wireless communication media and a wireless communication medium processing device comprising:
- a magnetic member comprising the sintered ferrite sheet of claim 5;
- a conductive loop antenna provided on one surface of the magnetic member; and
- a conductive layer provided on the opposite surface of the magnetic member from the conductive loop antenna.

15. The conductive loop antenna module of claim 14, wherein the conductive
- layer has a thickness of 50 μm or less and a surface electric resistance 3Ω/□ or less.

16. A ferrite green sheet comprising:
- a pattern formed in a top surface of the ferrite green sheet, the pattern comprising an elongated recess in the sheet having a width W at the top surface and a round-shaped bottom having a radius of curvature R, wherein a ratio (W:R) of W to R is in a range from about 1:0.1 to about 1:0.5.

* * * * *